United States Patent
Perelman et al.

(10) Patent No.: US 6,902,639 B1
(45) Date of Patent: Jun. 7, 2005

(54) SEAMING PLASTIC FILM USING SOLVENT-BASED ADHESIVE BEAD

(75) Inventors: Alexander Perelman, Richmond, VA (US); David Jonathan DeFoggi, Midlothian, VA (US)

(73) Assignee: Reynolds Metals Company, Richmond, VA (US)

( * ) Notice: Subject to any disclaimer, the term of this patent is extended or adjusted under 35 U.S.C. 154(b) by 230 days.

(21) Appl. No.: 10/349,649

(22) Filed: Jan. 23, 2003

Related U.S. Application Data

(60) Provisional application No. 60/352,719, filed on Jan. 26, 2002.

(51) Int. Cl.[7] .............................................. B29C 53/00
(52) U.S. Cl. ..................... 156/203; 156/218; 493/264; 493/267; 493/276; 493/331
(58) Field of Search ................................ 156/155, 203, 156/217, 218; 493/211, 264, 266, 267, 276, 493/277, 293, 331, 334, 336

(56) References Cited

U.S. PATENT DOCUMENTS

| | | | | |
|---|---|---|---|---|
| 2,307,280 A | | 1/1943 | Krasno ........................ | 91/62.5 |
| 2,679,195 A | | 5/1954 | Whytlaw ....................... | 93/82 |
| 2,914,108 A | | 11/1959 | Coakley ....................... | 154/42 |
| 2,926,723 A | | 3/1960 | Clark .......................... | 154/42 |
| 3,005,742 A | | 10/1961 | Kennedy, Jr. ................. | 156/187 |
| 3,597,292 A | * | 8/1971 | Takeda ......................... | 156/203 |
| 4,035,211 A | | 7/1977 | Bill et al. .................... | 156/54 |
| 4,276,333 A | | 6/1981 | Cobean ......................... | 428/36 |
| 4,477,304 A | | 10/1984 | Westermann ................... | 156/250 |
| 4,617,683 A | | 10/1986 | Christoff ....................... | 383/63 |
| 4,708,705 A | * | 11/1987 | Aubry et al. .................. | 493/211 |
| 5,507,872 A | | 4/1996 | Antenucci et al. ............ | 118/712 |
| 5,759,337 A | | 6/1998 | Fujio et al. .................. | 156/443 |
| 6,312,550 B1 | | 11/2001 | Tiburtius et al. ............. | 156/292 |

OTHER PUBLICATIONS

EFD Brochure, "When you specify boringly reliable fluid dispense valve systems, you say "Good-bye" to costly downtime." pp. 1-4, 12-13, 24-25, 37-40, Printed in U.S.A. ©2000 EFD Inc.

* cited by examiner

*Primary Examiner*—Jeff H. Aftergut
*Assistant Examiner*—John L. Goff
(74) *Attorney, Agent, or Firm*—Tracey D Beiriger; Eckert Seamans Cherin & Mellott

(57) ABSTRACT

A solvent-based adhesive is used to form a continuous, adhesively bonded and welded seam at the longitudinal edge portions of plastic film which have been overlapped. First, a bead of the adhesive is disposed on the edge portion of a web of film passing over an applicator roll. Next, as the film moves between the applicator roll and nip rolls, the adhesive dissolves a portion of the film to form a longitudinal channel having a generally semicircular cross-section. Then the edge portion is overlapped onto the other edge portion with the bead of adhesive between them. Finally the overlapped edge portions are squeezed between the nip rolls, so that the adhesive exudes laterally outward from the groove and is distributed smoothly between the overlapped edge portions, until the adhesive and dissolved film form a uniform band having a rounded hat-shaped cross-sectional profile.

23 Claims, 6 Drawing Sheets

SEAMING PLASTIC FILM USING SOLVENT-BASED ADHESIVE BEAD

This application discloses and claims subject matter which was disclosed in provisional patent application Ser. No. 60/352,719, filed Jan. 26, 2002 and titled Seaming Plastic Film Using Solvent-Based Adhesive Bead.

TECHNICAL FIELD

This invention pertains to the field of using a solvent-based adhesive to form a continuous, adhesively bonded and welded seam at the longitudinal edge portions of plastic film which have been overlapped, as for example in making continuous sleeves of plastic film by folding a single web of film into a tube and then forming the seam at its opposite longitudinal edge portions.

Uses of such sleeves include decorative and protective labels for food products such as coffee creamer and sweetener in plastic, glass or metal containers. Typically, heat-shrinkable sleeves are printed with graphics and text, cut to length, and heat-shrunk onto and around both ends of the food containers.

BACKGROUND ART

The art of adhesively seaming plastic film to make sleeves is fairly well developed. It is well known that the seams should meet certain basic requirements as well as specific requirements of particular foods and their containers. These basic requirements include speed and efficiency in manufacturing the sleeves and in applying them to a food container, as well as strength, appearance, reliability, and minimum tendency to snag, after the sleeves have been heat-shrunk onto a food container. In one way or another an ability to meet and exceed these requirements benefits the sleeve manufacturer, the food product supplier who applies the sleeves to food containers, and the consumer who purchases the food product and opens the container.

Prior art technology for using solvent-based adhesives to manufacture seamed sleeves of plastic film has required that an applicator contact the film. Such applicators employ either a felt wick or a wheel to apply the adhesive to the film. This technology has inherent problems that reduce efficiency. Felt applicators tend to pick up foreign matter from the surface of the film, causing the felt to plug. A second challenge with felt applicators is consistent delivery of adhesive to the wick and then onto the film. Wheel applicators transfer adhesive to the film from a delivery system such as another wheel or a felt pad. Wheel applicators have problems with pickup of foreign matter, wear on the wheel, and out-of-round conditions on the wheel or backup roll. All of the problems described for felt and wheel applicators result in inconsistent application of solvent. This in turn results in the following:

1. Open seams caused by adhesive skips that are severe enough to result in areas where there is no adhesive.
2. Blocked rolls, a condition which occurs when there is too much adhesive and the excess adhesive goes outside of the overlap seam, adhering the seam area to the next layer on the roll.
3. Uneven seam width, a condition in which the width of the adhesive bead varies, making it difficult to seam close to the edge of the film without causing blocked rolls.
4. Weak seams, which result from insufficient adhesive to create a strong bond.

Line speed and the amount of ink or other foreign material in the seam area, as well as temperature and humidity, may aggravate these problems.

Another problem with prior art contact applicators is that they must apply the adhesive in a relatively wide band of generally rectangular cross-section. FIGS. 1 and 2 show film 2 on which such a band of adhesive 4 has been applied. The width of adhesive 4 requires wider seams and exacerbates the problems of controlling the location of the adhesive with respect to the edge portions of the film. Moreover, the uniform thickness (height) of the adhesive band promotes "dog bones", a term which refers to the cross-sectional shape of adhesive and dissolved film after the film has been squeezed between nip rolls. FIG. 2 shows the adhesive and dissolved film 6 having such a dog bone shape in the final seam. The dog bone shape is undesirable because it tends to cause adhesive to flow beyond one or both film edges, where it will result in blocked rolls.

Another problem with prior art contact applicators is that, in order to accommodate varying workpiece (i.e., "line" or "film") speeds, the quantity of adhesive applied to the film is adjusted by measures aimed directly at increasing the volumetric flow of adhesive, as for example varying the speed of a pump supplying the adhesive to the wick or valving that restricts the flow. Such measures complicate control of the process.

In other prior art technology, a bead of hot melt adhesive is extruded onto the film just before the seam is passed between the nip rolls. See, for example, Clark U.S. Pat. No. 2,926,723. This technology introduces a different set of problems, some of which are identified and addressed by the Clark patent.

SUMMARY OF THE INVENTION

The seaming process according to the invention consists of two basic steps.

First, a bead applicator is used to apply a narrow but swelling bead of solvent-based adhesive to moving plastic film. The adhesive bulges above the surface of the film by virtue of its own surface tension. The seam is kept open to the air for a period of time, which depends upon the running speed of the film. During this time the adhesive partially dissolves a channel in the film to which it was applied. A portion of the adhesive settles into the channel and the remainder is left bulging above the surface in a mushroom profile.

The second step is to bring the layer of film with the adhesive disposed in its channel into contact with a second layer of film and to create the adhesive joint (i.e., a uniform band of the adhesive and dissolved film) by pressing the two layers together. During this step the adhesive that remained above the surface of the film in the first step of the process is spread out under pressure, creating a joint with a rounded hat-shaped cross-sectional profile.

The invention utilizes an adjustable dispensing valve having a replaceable hollow, tubular dispensing tip mounted on one end, very close to film passing over an applicator roll. The passage in the tip has a round cross-sectional profile, preferably either circular or elliptical with the major axis to the ellipse parallel to the roll surface, and is sized so that a constant stream of adhesive is maintained across the gap. The valve is calibrated to deliver a set volume of adhesive at a predetermined pressure. Varying the pressure on the adhesive delivery line automatically and precisely controls the adhesive volume delivered. A PLC is used to calculate the required pressure and then vary the actual pressure based upon line speed.

The invention provides precision control of adhesive delivery, thereby producing a stable seam width across wide windows of operating conditions, which in turn permits a reliable and consistent seam, precise control of seam width, reduced operator intervention, and reduced scrap. This precision control is possible because the invention (1) eliminates adhesive flow volume as a control variable; (2) establishes a direct link between film speed and fluid pressure in the adhesive delivery line; and (3) utilizes predetermined values of such pressure to automatically deliver to the film a bead having a specific and constant width. Such production control allows the film speed to vary greatly during a production run, as may be necessary in ramping the speed up or down for roll changing, maintenance, or suspension of production for reasons related to personnel, while still producing a high-quality, salable product. Using the invention enables continuous production of film during a production run in which the film speed is as low as 50 feet per minute and as high as 800 feet per minute (or even higher than 800 feet per minute), without generating any scrap. It even appears that seam quality improves with higher line speeds, and that ultimately the maximum possible film speed will be determined by factors other than adhesive delivery and behavior.

The advantages of the invention also extend to multiple production runs, each for a different seam specification, since many different specifications can be produced by merely using different predetermined computer settings for the above-mentioned link between film speed and pressure on the adhesive and, if necessary, by changing to a different dispensing tip. These simple techniques enable variations in the width of the joint from about 0.5 mm to at least 6.0 mm.

DESCRIPTION OF THE PREFERRED EMBODIMENT

The following terms will be used throughout this application in accordance with these definitions, unless a different interpretation is required by the context. The term "solvent-based adhesive" means a flowable adhesive for plastic film, which adhesive contains a volatile organic liquid vehicle capable of dissolving the film. The term "round" and "rounded" refer to a circle, an oval, an ellipse, or a similar, closed, curved figure. The term "rounded hat-shape" refers to the profile of a man's hat having a rounded crown and a flat, substantially uniform brim. A campaign or "Smokey the Bear" hat is an example of such a hat. The term "film speed" refers to the line speed of the plastic film workpiece, including instantaneous as well as constant speed.

The present invention can be used to seam heat-shrinkable films such as polyvinyl chloride (PVC), glycol modified polyethylene terephthalate (PETG), and oriented polystyrene (OPS). The presently preferred solvent-based adhesive (sometimes referred to as "seaming solution") is Flexcraft #12-96 or Flexcraft 12-70 from Flexcraft Industries, 390 Adams Street, Newark, N.J. 07114. The solvent base of these adhesives is 1-methyl-2-pyrrolidinone.

The presently preferred basic tube forming and seaming apparatus is Rotograf T/E seamer FG-600 Dense, which is available from Rotograf S. A., Z.I. 55600, Marville, France. Such apparatus are referred to in the art as a "tube former", a "tube machine", a "tube forming machine", or a "tuber". The preferred dispensing valve is the EFD 740V-SS, and the preferred dispensing tip is the EFD Ultra tip, part #5125TLC-B, both of which are available from EFD Inc., 977 Waterman Avenue, East Providence, R.I. 02914-1378. This commercially available equipment is used in carrying out the present invention, in addition to its various other uses.

Figure 1:
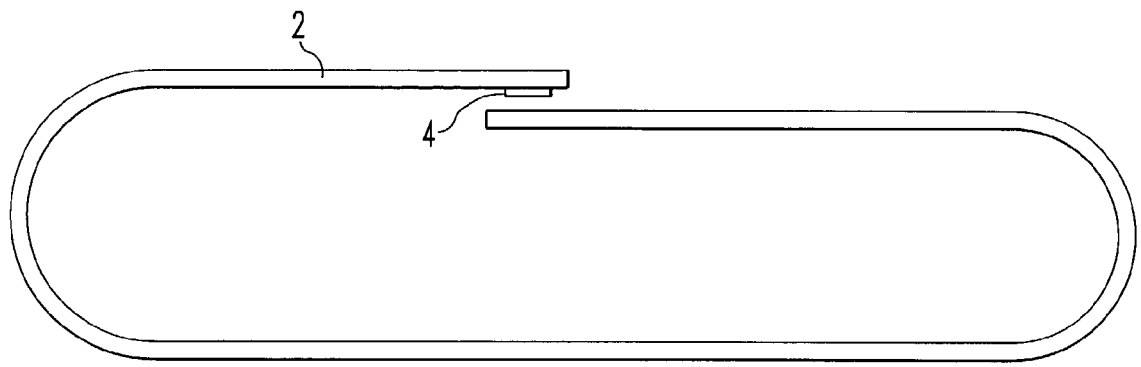
FIG. 1 is a cross-section view of a sleeve of plastic film 2 to which a band of adhesive 4 has been applied in accordance with prior art contact application technology.
Figure 2:
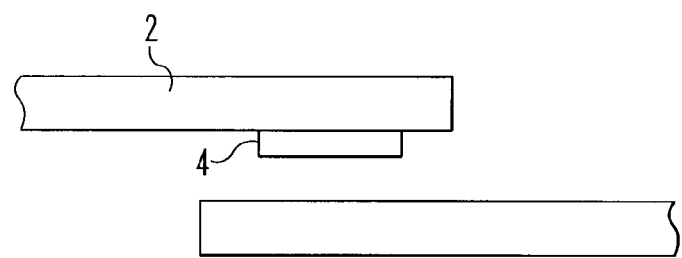
FIG. 2 is a detail view of the overlapping edge portions of the film shown in FIG. 1 before the film has passed between the nip rolls.
Figure 3:
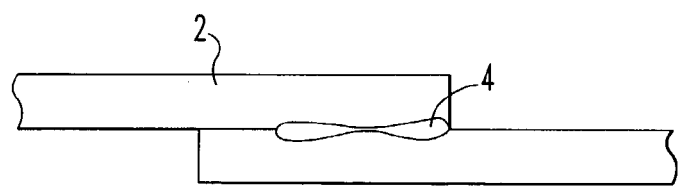
FIG. 3 is a detail view similar to FIG. 2, after the film has passed between the nip rolls.
Figure 4:
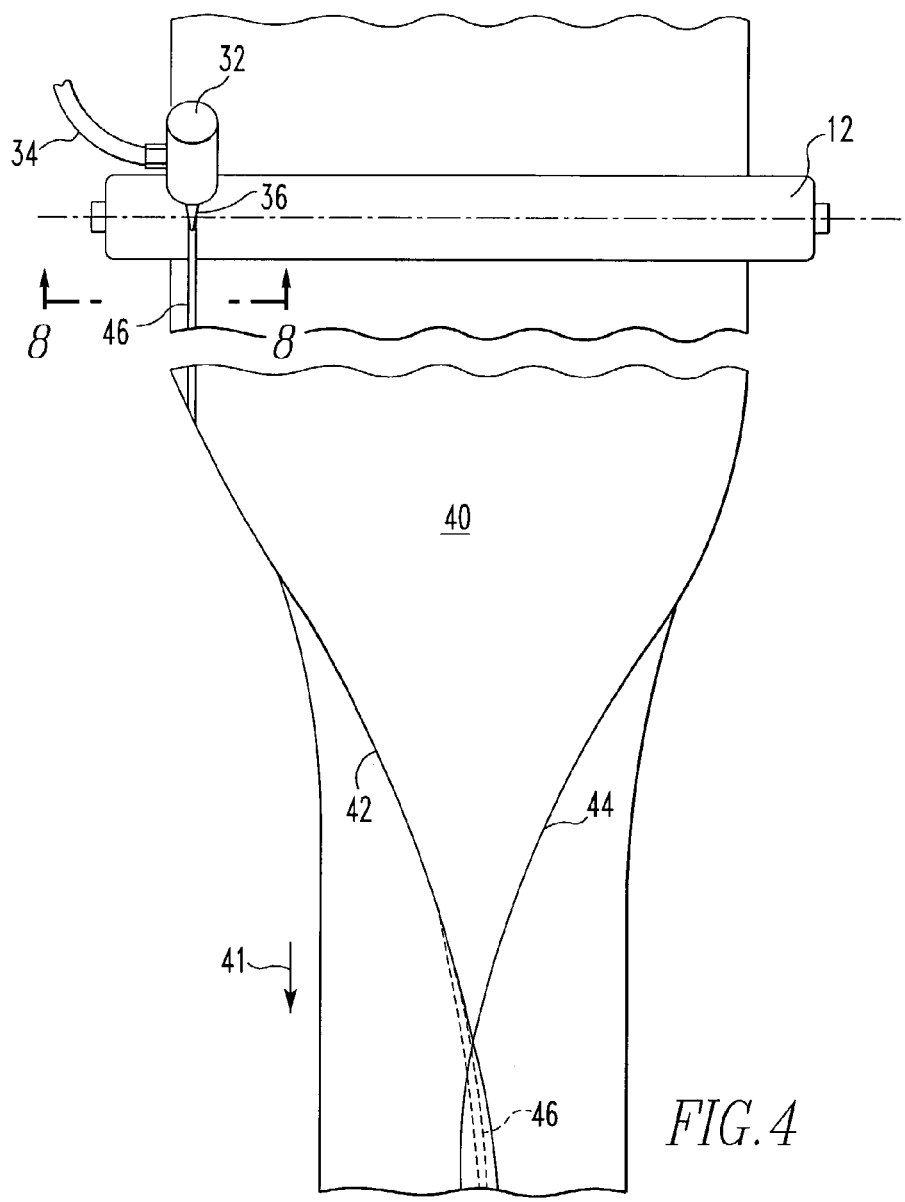
FIG. 4 is a schematic plan view of an applicator roll, a dispensing valve and tip, and film having adhesive applied to it and being formed into a tube.
Figure 5:
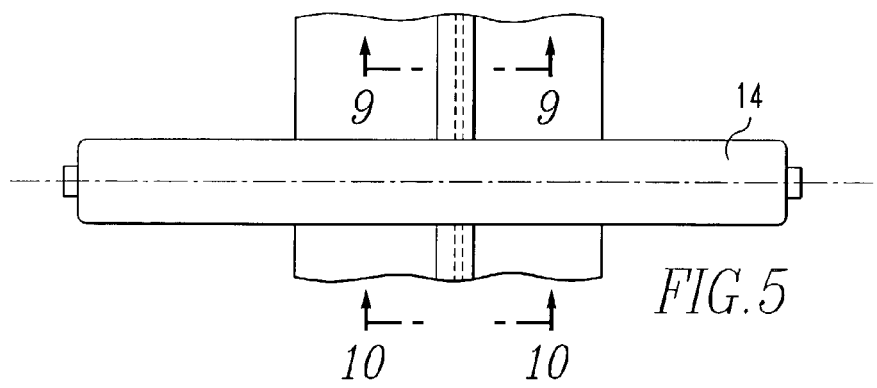
FIG. 5 is a schematic plan view of the nip rolls with the film and adhesive passing between them.
Figure 6:
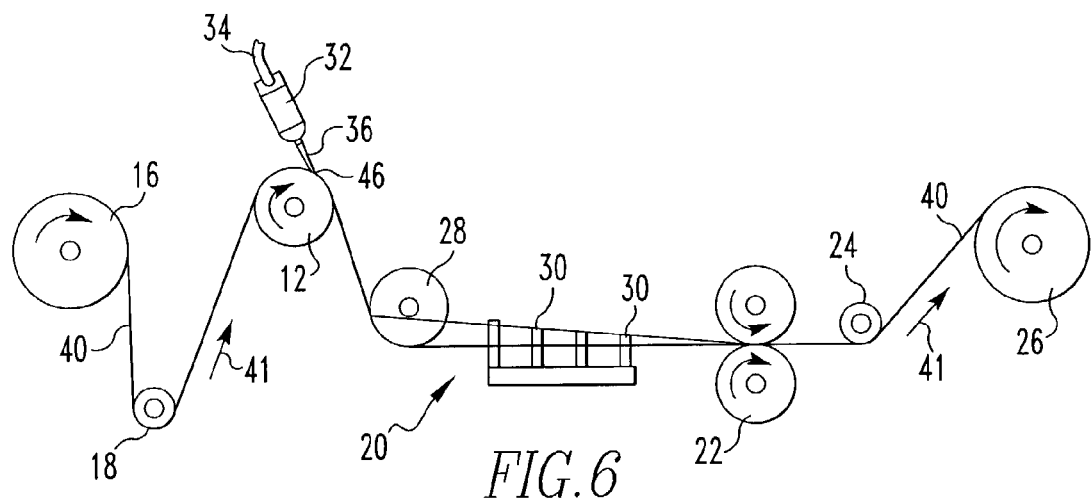
FIG. 6 is a schematic elevation view of an unwind roll, an applicator roll, a dispensing valve and tip, a folding mechanism, nip rolls, and a rewind roll.
Figure 7:
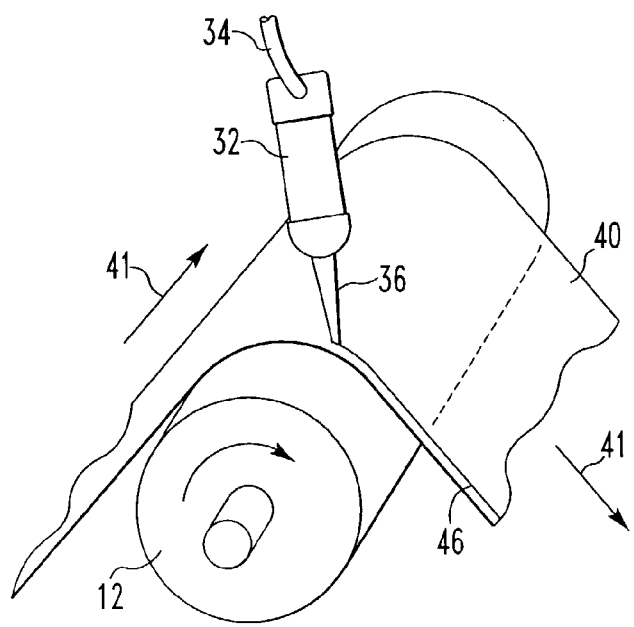
FIG. 7 is a schematic detail view of the applicator roll and the dispensing valve and tip shown in FIG. 6.

FIG. 4 through FIG. 7 show applicator roll 12 and nip rolls 14 of a tube forming and seaming machine. As shown in FIG. 6, the machine comprises, going from upstream to downstream, film unwind roll 16, tracking mechanism 18, folding mechanism 20, nip rolls 22, tension control idler 24, and rewind roll 26. Folding mechanism 20 includes roller 28 which is rounded at its opposite ends and felt strips which form a series of adjustable loops 30 that diminish in circumference. The apparatus described thus far in this paragraph is conventional. In accordance with the invention, dispensing valve 32 connected to adhesive delivery line 34 and replaceable hollow, tubular tip 36 is mounted at an angle with respect to applicator roll 12, with the tip spaced closely to the circumferential surface of applicator roll 12. Valve 32 is mounted so that this space may be adjusted by moving the valve forward or backward (in the direction the film is traveling). The angle of the valve and tip with respect to the circumferential surface of the roll may also be adjusted. The inner diameter of tip 36 is typically from about 0.003 inch to about 0.005 inch. It may be as large as about 0.010 inch. The dispensing valve and tip, considered apart from the other apparatus described, are conventional.

Film 40 is unwound from unwind roll 16 and proceeds in the direction of arrows 41. Unwind roll 16 may be part of an unwind station (not shown) which permits new rolls to be substituted for spent rolls without manually attaching the two webs together. Film 40 proceeds over tracking mechanism 18, which aligns the film, and then over applicator roll 12, where a bead of adhesive 46 passes through valve 32 and tip 36 and is laid down on the surface of film 40, which is supported by applicator roll 12. The adhesive is forced through valve 32 and tip 36 by the pressure exerted on it in a pressure tank (not shown) containing nitrogen or clean air, which tank is connected to inlet line 34 and to a remote pressure source through appropriate valving. Typically tip 36 is spaced 0.005 inches from film 40, but this distance may vary from about 0.001 inch to about 0.010 inch, depending upon the specific adhesive used, the width of the adhesive band desired to be laid down to make a particular seam, and the configuration and inner diameter of the tip. It is believed that this range could extend from 0 inch to about 0.010 inch. Film 40 then proceeds to conventional folding mechanism 20, where it is folded into a tube with its opposite longitudinal edge portions overlapping. Next, film 40 passes between nip rolls 14, where the two edge portions are squeezed together to create the seam. Finally, film 40 passes over tension control idler 24 and onto rewind roll 26. Rewind roll 26 may be part of a rewind station (not shown) which permits empty rolls to be substituted for full rolls, without manual attachment of a cut film edge to an empty roll core.

Figure 8:
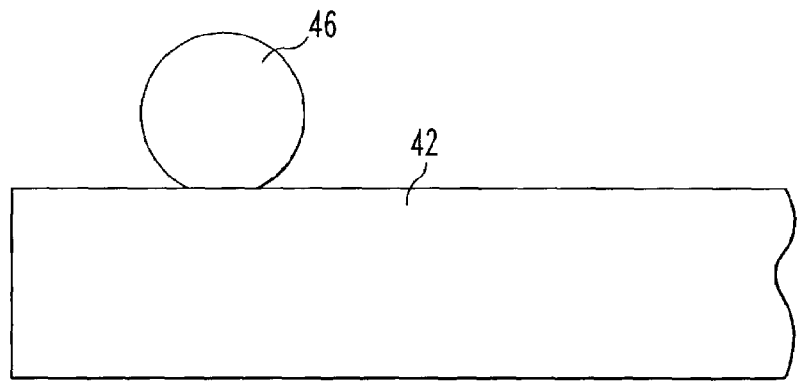
FIG. 8 is a section of FIG. 4 taken at 8—8, showing adhesive which has been applied to one edge portion of plastic film according to the present invention.

FIG. 8 shows edge portion 42 of flat web of film 40 just after bead of adhesive 46 has been applied to it.

Figure 9:
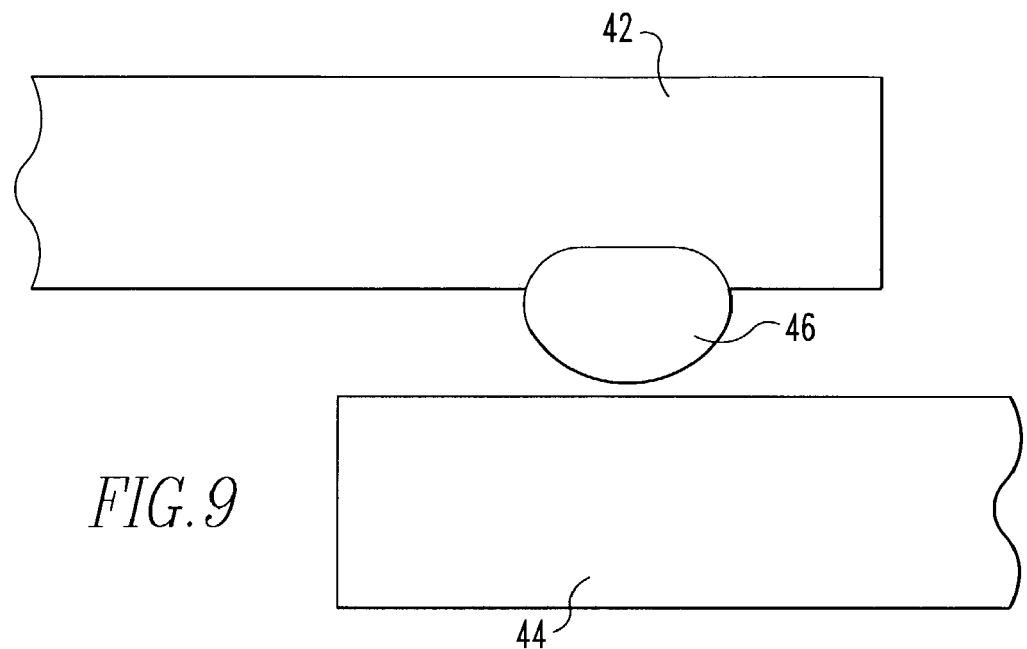
FIG. 9 is a section of FIG. 4 taken at 9—9, showing the overlapping edge portions of the film and adhesive according to the present invention before the film has passed between the nip rolls.

FIG. 9 shows edge portion 42 later, just after film 40 has been folded into a tube with edge portions 42, 44 overlapped, as bead of adhesive 46 is about to contact edge portion 42. The time interval between FIGS. 4 and 5 may vary from about 0.3 seconds to about 4.0 seconds. It is believed that this interval could be as brief as 0.2 seconds. A typical distance between applicator roll 12 and nip rolls 14, as measured along the film, is 4.5 feet. During this interval the solvent in adhesive bead 46 has dissolved some of the film, creating channel 48 in edge portion 42. Channel 48 helps confine bead 46 and limit its lateral movement.

Figure 10:
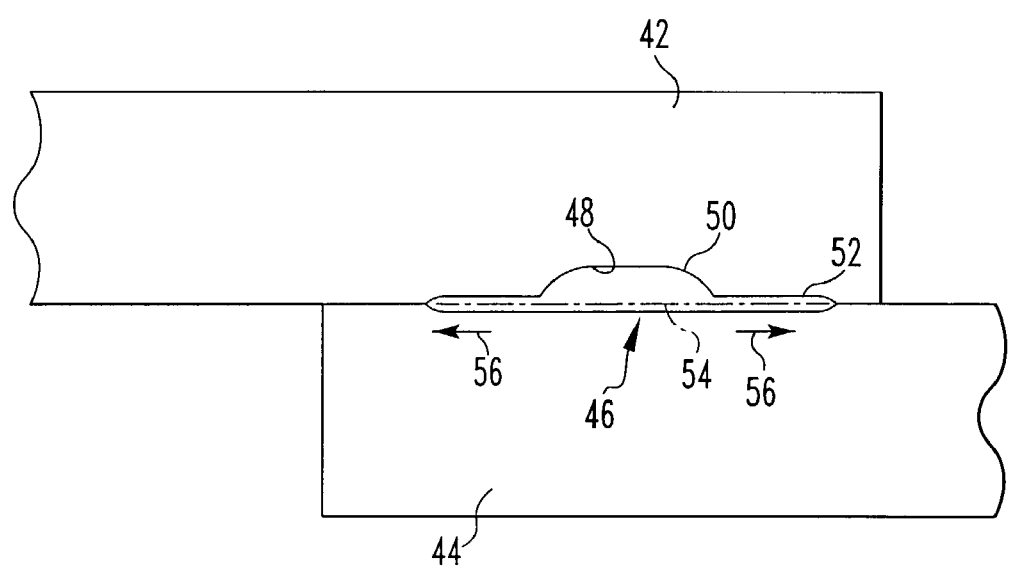
FIG. 10 is a section of FIG. 4 taken at 10—10, showing the overlapping edge portions of the film and adhesive according to the present invention after the film has passed between the nip rolls.

FIG. 10 shows film edge portions 42, 44 and adhesive (mixed with dissolved film) 46 just after they have passed between the nip rolls. Adhesive 46 now has a rounded hat-shape cross-sectional profile, with crown 50 and brim 52. Crown 50 occupies channel 48, and brim 52 lies along the interface between edge portions 42 and 44. Chain line 54 indicates the original position of the surface of edge portion 42.

The rapid transition between FIGS. 9 and 10, which occurs just prior to the nip rolls and in the nip of the nip rolls, is important. As film edge portions 42, 44 are being progressively squeezed by the nip rolls, adhesive 46 is progressively exuded laterally into the interface in the direction of arrows 56. We believe that channel 48 is a critical factor in creating a strong seam of precisely and neatly placed adhesive, but we cannot describe with certainty the physical principles involved. There are several possibilities. One possibility is that the channel confines the adhesive bead so that it is not displaced laterally during the movement of the film as it is being handled between the applicator roll and the rip roll. Another possibility is that the channel increases the stability of the bead during its compression by the nip rolls, by reducing its effective height. Another possibility is that the channel increases the stability of the bead during such compression because of the increased surface contact provided by the channel. Another possibility is that during compression the body of adhesive material in the channel acts as a "reservoir" of adhesive which, when exuded from the channel, is "metered out" laterally into the interface more gradually than it would have been in the absence of a channel. Another possibility which takes into account flow of the adhesive ahead of the rip rolls in the longitudinal direction (i.e., toward a viewer of FIG. 10 and toward rewind roll 26 in FIG. 6) is that the channel acts as a guide for such forwardly flowing adhesive which has been partially, but not completely, squeezed by the rip rolls. We believe that one or some combination of these possibilities probably occurs, but we do not represent that all of them occur, and we do not wish to be bound by particular theories underlying our invention.

In the final seam, crown 50 of the hat-shape is believed to serve as a mechanical anchor in film edge portion 42. Typical dimensions of the crown and brim are 0.5 mm and 2.5 mm, respectively. The width of the brim should be at least 0.3 mm. Normally it would be less than 3.0 mm.

Figure 11:
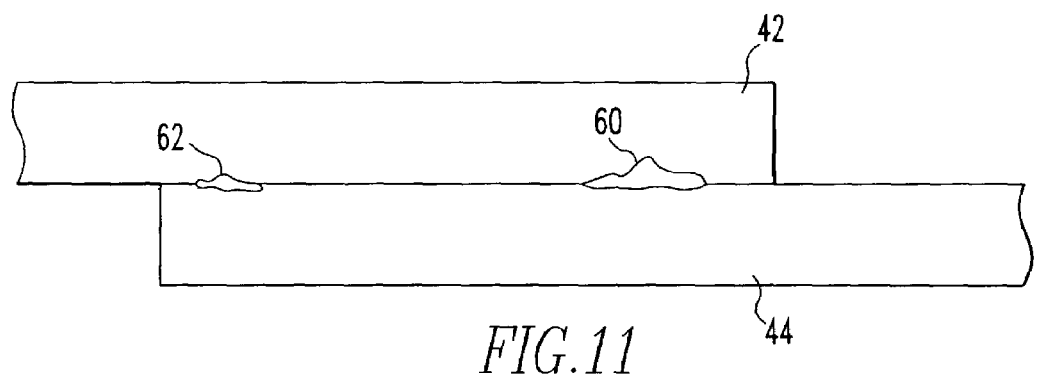
FIG. 11 is a detail similar to FIG. 10, but showing an embodiment in which the adhesive has been applied in two beads instead of a single bead.

FIG. 11 shows an embodiment having two adhesive joints, a hat-shaped joint 60 of larger cross-sectional profile and a hat-shaped joint 62 of smaller cross-sectional profile. Joint 60 provides the strength of the single joint described above, while joint 62 keeps the portion of the film nearest the edge from lifting up or snagging after the sleeve has been heat-shrunk onto a container.

Figure 12:
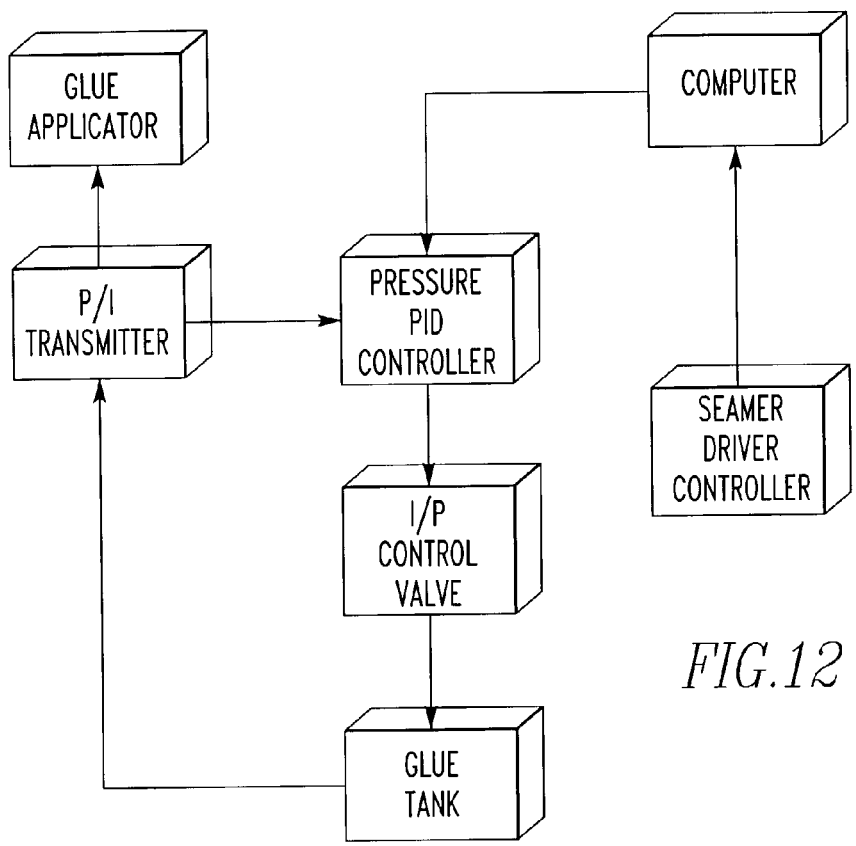
FIG. 12 is a diagram of the system for controlling the pressure in the adhesive delivery line.

The system for controlling the pressure in the adhesive delivery line is shown in FIG. 12. The computer receives a speed signal from the seamer drive controller that is proportional to the film speed, then calculates a pressure value that is also proportional to film speed. It sends this signal to a closed loop PID controller to be used as a pressure setpoint for the system. The PID controller then uses this setpoint to control the output pressure at the applicator by means of sending a pressure signal to an I/P control valve and monitoring the output pressure at the applicator by a pressure signal sent back by a P/I transmitter mounted near the applicator. The PID controller maintains a pressure proportional to film speed by continuously monitoring the setpoint and feedback signals.

Figure 13:
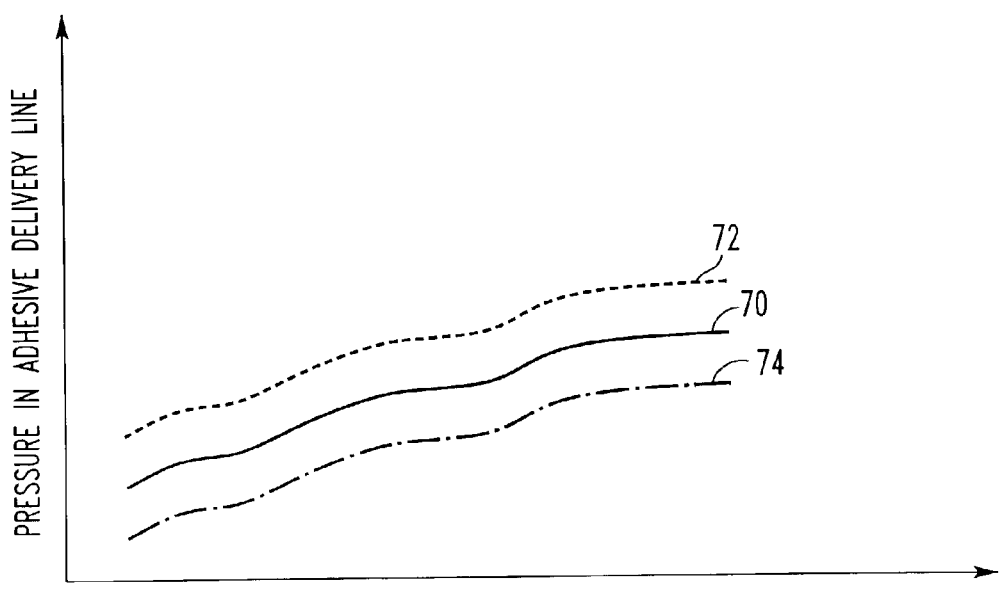
FIG. 13 is a graph showing the relationship between film line speed and fluid pressure in the adhesive delivery line.

FIG. 13 is a graph in which solid line 70 shows the relationship between film line speed and fluid pressure in the adhesive delivery line for a producing sleeves for a particular dispensing tip, a particular adhesive, and a particular film. To widen the bead of adhesive being laid down, the computer is adjusted so that the entire curve is moved up to the location shown by broken line 72. To narrow the bead, the computer is adjusted so that the entire curve is moved down to the location shown by chain line 74.

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

What is claimed is:

1. A method of forming a seam at overlapped first and second longitudinal edge portions of plastic film comprising the steps of providing an applicator roll, a dispensing valve with a dispensing tip spaced closely to the circumferential surface of the applicator roll, two nip rolls downstream of the applicator roll, and at least one web of plastic film;

moving the film longitudinally over the rotating applicator roll and then between the rotating nip rolls;

dispensing, through the valve and tip, a round, continuous bead of a solvent-based adhesive, and laying that bead onto the first edge portion of the film while the film is supported by the applicator roll;

dissolving into the adhesive, while the film is moving between the applicator roll and the nip rolls, part of the first edge portion of the film so as to form therein a longitudinal channel having a generally semicircular cross-section;

overlapping the second edge portion onto the first edge portion, with the bead of adhesive between the two overlapped edge portions;

squeezing the overlapped edge portions between the nip rolls, whereby the adhesive exudes laterally outward from the channel and is distributed smoothly between the overlapped edge portions, until the adhesive and dissolved film form a uniform band having a rounded hat-shaped cross-sectional profile.

2. A method according to claim 1 wherein the first and second edge portions are the opposite edge portions of a single web of film which has been folded into a tube.

3. A method according to claim 1 wherein the first and second edge portions are the edge portions of two webs of film.

4. A method according to claim 1 wherein the film is shrinkable.

5. A method according to claim 1 wherein the film is heat-shrinkable.

6. A method according to claim 1 wherein the dispensing tip is spaced from the film by a distance of from 0 inch to about 0.060 inch.

7. A method according to claim 1 wherein the dispensing tip is spaced from the film by a distance of from about 0.001 inch to about 0.010 inch.

8. A method according to claim 1 wherein the dispensing tip is spaced from the film by a distance of about 0.005 inch.

9. A method according to claim 1 wherein the inner diameter or width of the dispensing tip is greater than 0.003 inch.

10. A method according to claim 1 wherein the dispensing tip is circular or elliptical.

11. A method according to claim 1 wherein the dispensing tip is circular and the inner diameter of the dispensing tip is from about 0.003 inch to about 0.010 inch.

12. A method according to claim 1 wherein the inner diameter of the dispensing tip is from about 0.003 inch to about 0.005 inch.

13. A method according to claim 1 wherein the dispensing tip is elliptical and the width of the tip is from about 0.003 to about 0.08 inch.

14. A method according to claim 1 wherein the film is moving at a speed of at least 50 feet per minute.

15. A method according to claim 1 wherein the time period during which the solvent dissolves the film between the applicator roll and the nip rolls is at least 0.2 seconds.

16. A method according to claim 1 wherein the time period during which the solvent dissolves the film between the applicator roll and the nip rolls is at least 0.3 seconds.

17. A method according to claim 1 wherein the width of the brim is greater than about 0.3 mm.

18. A method according to claim 1 wherein the width of the brim is from about 0.3 mm to about 3.0 mm.

19. A method according to claim 1 wherein the width of the brim is from about 0.3 mm to about 8.0 mm.

20. A method according to claim 1 which precisely controls the width of the bead and comprises the further steps of moving the plastic film at a first speed, sensing that first speed, selecting a first predetermined value of fluid pressure in the delivery line which corresponds to that first speed and causes the dispensing tip to dispense a bead having a desired width and cross-sectional profile, establishing that first predetermined fluid pressure in the delivery line, moving the plastic film at a second, different speed while continuing to practice said method, sensing that second speed, selecting a second, different predetermined value of fluid pressure in the delivery line which corresponds to that second speed and causes the dispensing tip to dispense a bead having precisely the same width and cross-sectional profile, and establishing that second predetermined fluid pressure in the delivery line.

21. A method according to claim 11 wherein said sensing, selecting, and establishing steps are performed automatically and without operator intervention.

22. A method according to claim 11 wherein the change in fluid pressure in the delivery line from the first value to the second value is sufficient to cause the bead dispensed at the second value to retain precisely the same width and profile, without any additional control of the volume of adhesive flow.

23. A method according to claim 11 wherein the first speed is less than 100 feet per minute and the second speed is greater than 500 feet per minute.

* * * * *